ID

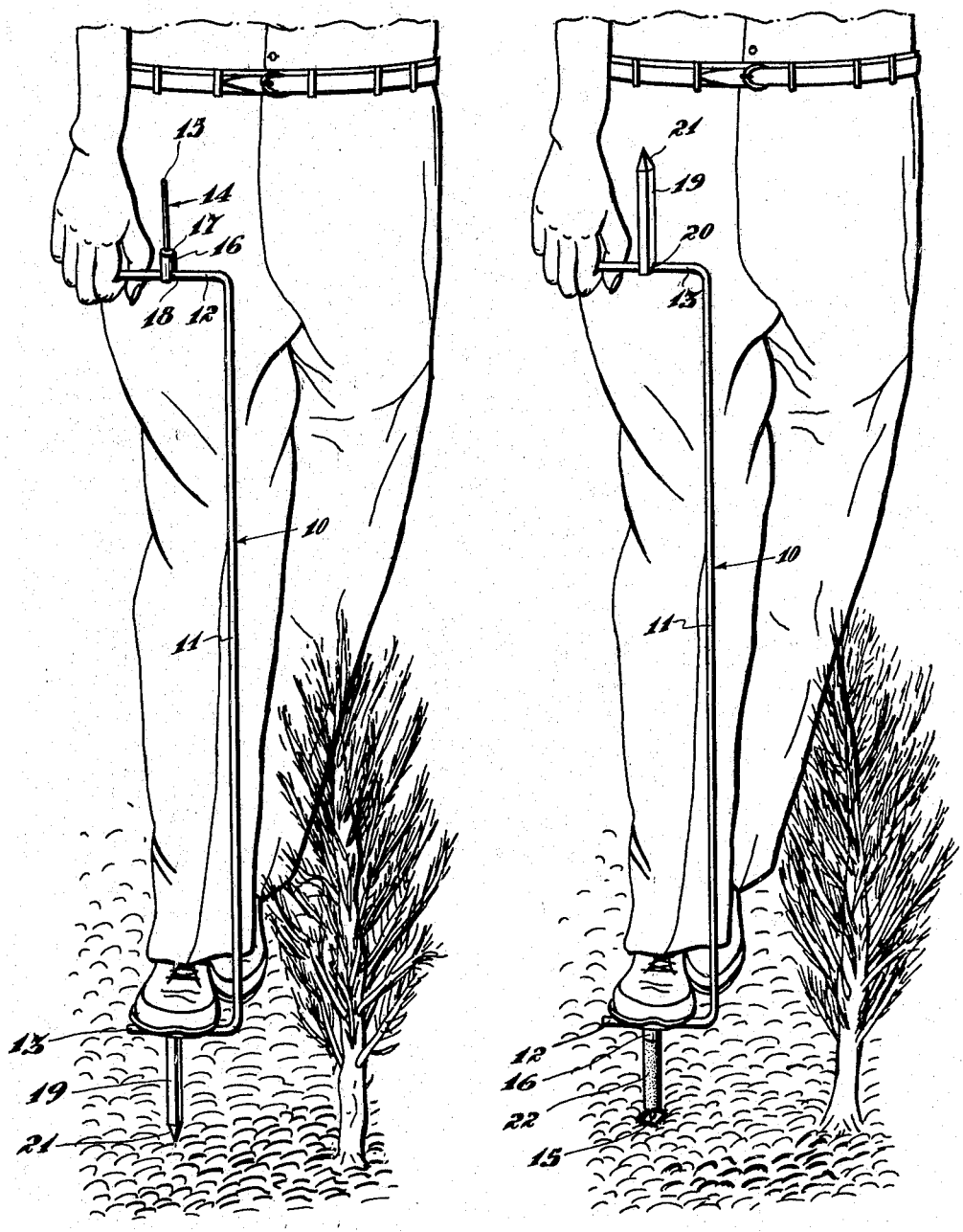
Dec. 13, 1966     R. D. PARRY     3,290,821
STICK-TYPE FERTILIZER AND APPLICATOR
Filed March 27, 1964     2 Sheets-Sheet 1
INVENTOR.
Robert D. Parry
BY
Wood, Herron & Evans
ATTORNEYS

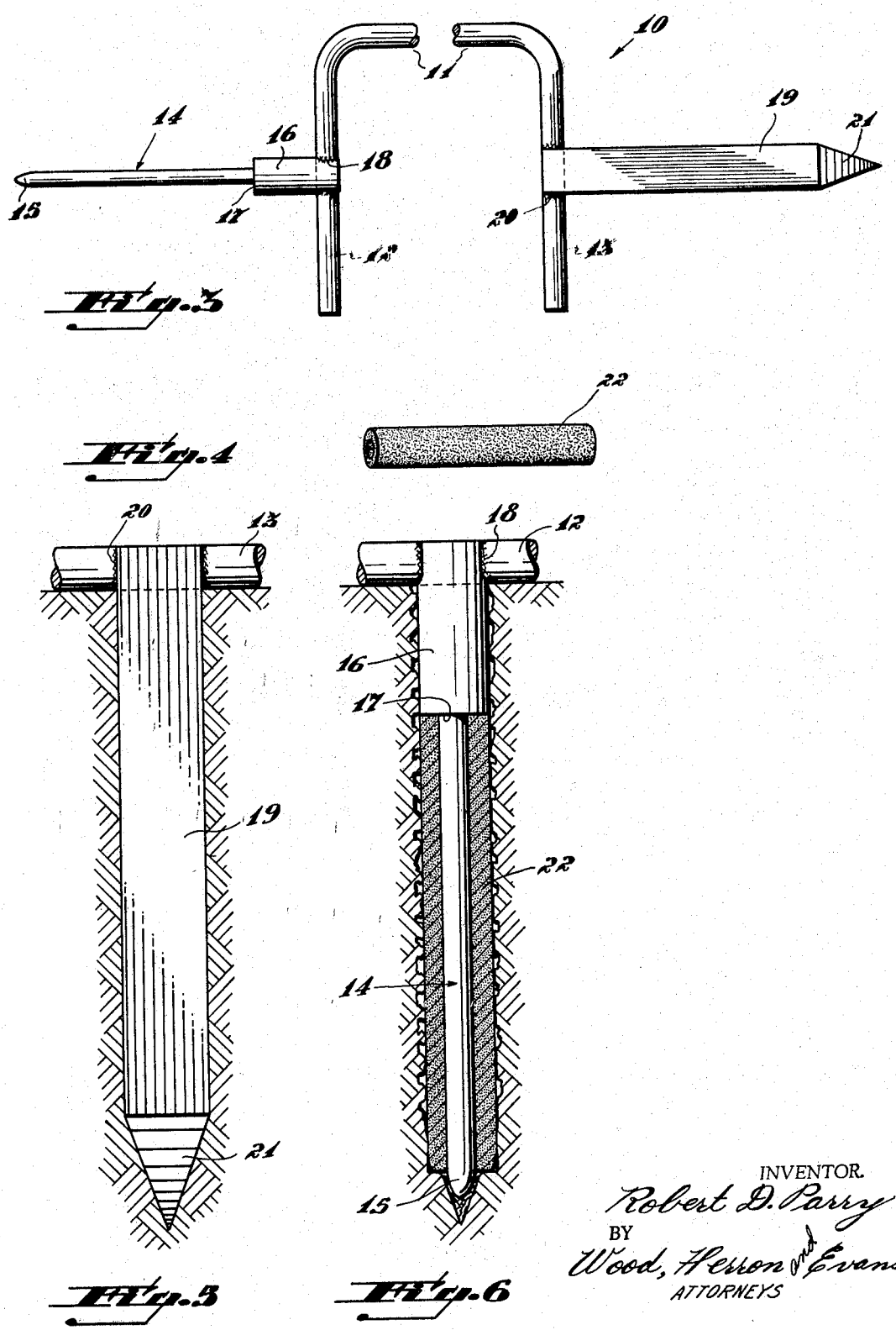

United States Patent Office 3,290,821
Patented Dec. 13, 1966

3,290,821
STICK-TYPE FERTILIZER AND APPLICATOR
Robert D. Parry, 1336 Custer Ave., Cincinnati, Ohio
Filed Mar. 27, 1964, Ser. No. 355,235
3 Claims. (Cl. 47—48.5)

This invention relates to fertilizer of the type that is provided in stick form so that it may be driven into the ground near the base of a plant to provide a constant source of food for the plant's roots.

The primary objective of the invention has been to facilitate the application of fertilizer of this type and toward this end, there is provided an applicator tool and a unique form of stick fertilizer adapted to be received by and then inserted into the ground by the tool. Thus, the invention encompasses the tool, the fertilizer and the combination of the two.

In the preferred embodiment of the invention, the applicator tool has a stake at one end and a spike at the opposite end. The two are attached at the opposite ends of a rod that is turned over at right angles to provide a foot rest upon which a person may rest his foot, in the first instance, to drive the stake into the ground to make a hole and, in the second instance, after the rod has been turned end for end, to drive the stick of fertilizer into the prepared hole.

The fertilizer is in the form of a hollow tube. The inside diameter of the tube is of a size to be telescoped over the spike with enough of a friction fit to hold the tube in place on the spike. The outside diameter of the tube is related to the size of the stake such that when the tube is placed into a prepared hole, there is sufficiently greater friction between the tube and the sides of the hole to overcome the friction fit between the spike and the tube. Thus, the spike readily may be withdrawn from a tube of fertilizer and inserted into a prepared hole.

Other objectives and advantages of the invention will be readily apparent to those skilled in the art from the following description of the drawings in which:

FIGURE 1 is a perspective view showing the toool of this invention in use in which the stake end of the tool is to be driven into the ground.

FIGURE 2 is a view similar to FIGURE 1 in which the tool has been reversed and a tube of fertilizer is to be driven into the prepared hole.

FIGURE 3 is a side elevational view of the tool with the rod portion thereof broken away.

FIGURE 4 is a perspective view showing the preferred form of fertilizer.

FIGURE 5 is a fragmentary cross sectional view illustrating the way in which the stake end of the tool is driven into the ground to prepare a hole.

FIGURE 6 is a view similar to FIGURE 5 illustrating the way in which the fertilizer is inserted into a prepared hole.

Referring to FIGURES 1 and 2, the tool which is designated generally by the numeral 10, comprises a straight rod or shaft or connector portion 11, one end of which is turned over at a right angle to provide a foot rest or step 12 and the opposite portion of which is turned over at a right angle to provide a foot rest or step 13. A spike 14 having a pointed end 15 is affixed to the step portion 12 so as to extend in parallelism with the shaft portion 11, but being offset with respect thereto as illustrated. The spike includes a collar 16 where it joins the step 12, the collar being larger in diameter than spike 14 and providing a shoulder 17, the purpose of which will be explained. The collar 16 may be secured to the stepped portion 12 as by welding 18.

A stake 19 is secured to the step 13 as by welding 20. It is preferred that the longitudinal axis of the stake 19 coincide with the longitudinal axis of the spike 14, although it can be appreciated that this relationship is not critical. As best shown in FIGURES 3 and 5, the stake 19 may be square in cross section and the outer end thereof is pointed as shown at 21 to assist its insertion into the ground. Here again, the exact cross sectional shape of the stake is not critical.

A tube of fertilizer is illustrated at 22. This tube is made, in its preferred embodiment, of granular, commercial fertilizer that is mixed with a binder such as commercial wheat paste and then extruded into the shape shown, individual pieces being cut into the proper lengths at the time of the extrusion. Thus, in initially mixing the paste and fertilizer, a somewhat heavy mixture is made, something on the order of clay that is extruded to form land tile. After being extruded, the pieces are dried. Extruding the pieces of fertilizer have several advantages. It is not only a very economical way of forming the tubular pieces, but, in addition, it provides a certain amount of roughness for the surfaces of the tube. Thus, with the inside diameter of the tube made of a size to receive the spike 14, the roughness of the interior and slight distortion at the ends of the tube caused by the cutting operation, insure that the tube will be held on the spike.

As shown, the outside diameter of the tube and the outside diameter of the collar 16 preferably are the same size. Also, the outside diameter of the tube is preferably just slightly under the thickness of the stake 19 so that when a tube of fertilizer on spike 14 is driven into the ground as shown in FIGURE 6, the entry is without sufficient force to crack or crumble the tube. However, it is found that tubes of fertilizer of the type shown, bound with commercial wheat paste, is surprisingly strong and little apt to be injured in the normal use of the tool, being backed up by the shoulder 17 during entry into a prepared hole.

The outside roughness of the tube 22 is found to provide sufficiently great frictional force between the tube and the sides of a prepared hole into which the tube has been driven that there is no problem in the withdrawal of spike 14 after the tube of fertilizer has been driven into the ground to the point shown in FIGURE 6.

The use of commercial wheat paste as a binder, besides being inexpensive, has the distinct advantage that such paste is soluble in ground water, resulting in a gradual disintegration of the tube of fertilizer and a gradual dissipation of the plant food over a considerable area within the soil surrounding the hole in which the fertilizer is placed initially.

Having described my invention, I claim:

1. The combination of a stick-type fertilizer and an applicator for said fertilizer comprising an elongated tube of commercial, granular fertilizer bound in a water soluble binder, said applicator having a stake thereon adapted to be driven into the ground and having a spike thereon adapted to be driven into the ground, the inside diameter of the tube of fertilizer being such as to receive said spike in slip-fit relation and the outside diameter of the tube of fertilizer being such as to fit snugly into a hole prepared in the ground by driving said stake therein.

2. The combination of a stick-type fertilizer and an applicator for said fertilizer comprising an elongated tube of commercial, granular fertilizer bound in a water soluble binder, said applicator comprising an elongated rod having the opposite ends turned over at right angles to provide a step in each instance, a stake secured to one of said steps and adapted to be driven into the ground by foot pressure, a spike secured to the other step and adapted to be driven into the ground by foot pressure, the inside diameter of the tube of fertilizer being such as to receive said spike in slip-fit relation, and the outside diameter of the tube of fertilizer being such as to fit snugly into a hole prepared in the ground by driving said stake therein.

3. The combination of a stick-type fertilizer and an applicator for said fertilizer comprising an elongated, rigid hollow tube of fertilizer, said applicator being double ended and having a stake at one end thereof adapted to be driven into the ground by foot pressure and having a spike thereon at the opposite end adapted to be driven into the ground by foot pressure, the inside diameter of the tube of fertilizer being such as to receive said spike in slip-fit relation and the outside diameter of the tube of fertilizer being such as to fit snugly into a hole prepared in the ground by driving said stake therein.

References Cited by the Examiner

UNITED STATES PATENTS

| | | | |
|---|---|---|---|
| 182,989 | 10/1876 | Bernard | 111—4 |
| 2,032,608 | 3/1936 | Antrim | 47—48.5 |
| 2,082,712 | 6/1937 | McIvor. | |
| 2,117,808 | 5/1938 | Jones | 71—64 |
| 3,122,110 | 2/1964 | Wernicke | 111—4 |

FOREIGN PATENTS 177,426   3/1922   Great Britain.

ABRAHAM G. STONE, *Primary Examiner.*

WILLIAM A. SMITH III, *Examiner.*